(12) United States Patent
Zhang

(10) Patent No.: US 11,213,903 B2
(45) Date of Patent: Jan. 4, 2022

(54) SAWING MACHINE

(71) Applicant: DMT HOLDINGS, INC., Federal Way, WA (US)

(72) Inventor: Yongsheng Zhang, Federal Way, WA (US)

(73) Assignee: DMT HOLDINGS, INC., Federal Way, WA (US)

( * ) Notice: Subject to any disclaimer, the term of this patent is extended or adjusted under 35 U.S.C. 154(b) by 217 days.

(21) Appl. No.: 16/733,776

(22) Filed: Jan. 3, 2020

(65) Prior Publication Data
US 2021/0205903 A1    Jul. 8, 2021

(51) Int. Cl.
*B23D 45/02* (2006.01)
*B23D 59/00* (2006.01)
*B23D 47/02* (2006.01)
*B27B 5/18* (2006.01)

(52) U.S. Cl.
CPC ......... *B23D 45/028* (2013.01); *B23D 45/025* (2013.01); *B23D 47/02* (2013.01); *B23D 47/025* (2013.01); *B23D 59/006* (2013.01); *B27B 5/18* (2013.01); *B27B 5/187* (2013.01)

(58) Field of Classification Search
CPC .... B23D 45/028; B23D 47/02; B23D 59/006; B23D 45/025; B23D 45/021; B23D 45/14; B23D 47/025; B27B 5/184; B27B 5/18; B27B 5/187; B27B 5/188; B27B 9/00
See application file for complete search history.

(56) References Cited

U.S. PATENT DOCUMENTS

| 1,763,244 A | * | 6/1930 | Mattison | B27B 5/188 83/486 |
| 2,589,554 A | * | 3/1952 | Killian | B23D 45/025 83/522.25 |
| 2,719,550 A | * | 10/1955 | Monroe | B27B 5/188 83/486 |

(Continued)

FOREIGN PATENT DOCUMENTS

| CA | 2861991 A1 | * | 1/2014 | ............ B23D 47/02 |
| EP | 0972601 A2 | * | 1/2000 | ........... B23D 47/025 |
| WO | WO-2009047945 A1 | * | 4/2009 | ............ B27B 5/188 |

*Primary Examiner* — Sean M Michalski
(74) *Attorney, Agent, or Firm* — Hamre, Schumann, Mueller & Larson, P.C.

(57) ABSTRACT

The disclosure provides a sawing machine, including: a base; a main workbench rotatably connected to the base, an upper surface of the main workbench being provided with a chute, the chute extending in a first direction; a machine body slidably connected to the main workbench, a sliding direction of the machine body being parallel to the first direction, the machine body being provided with a motor and a saw blade connected to the motor; an auxiliary workbench being slidably inserted into the chute and protruded out of the chute from an open end, an upper surface of the auxiliary workbench is provided with an elongated groove, the groove extends in the first direction, the groove and the chute are in communication in the first direction and form an extendable saw blade slot. In the present disclosure, the cutting distance of the sawing machine can be extended, without increasing the overall volume of the sawing machine, increasing the packaging size, and increasing the transportation cost.

16 Claims, 10 Drawing Sheets

(56) References Cited

U.S. PATENT DOCUMENTS

| | | | | |
|---|---|---|---|---|
| 2,998,813 | A * | 9/1961 | Wilson | B28D 1/042 125/13.03 |
| 3,872,755 | A * | 3/1975 | Marsh | B27B 5/18 83/471.3 |
| 4,745,834 | A * | 5/1988 | Neumann | B23D 45/025 83/468 |
| 5,138,920 | A * | 8/1992 | Mayfield | B23D 45/025 188/82.84 |
| 5,207,141 | A * | 5/1993 | Dehari | B23D 45/048 83/471.3 |
| 6,000,387 | A * | 12/1999 | Lee | B23D 47/025 125/11.22 |
| 6,347,624 | B1 * | 2/2002 | Smith | B23D 47/025 125/13.01 |
| 7,219,585 | B1 * | 5/2007 | Kelly | B23D 45/021 125/13.01 |
| 7,387,056 | B2 * | 6/2008 | Higuchi | B23D 45/027 83/483 |
| 9,649,703 | B2 * | 5/2017 | Chiu | B23D 45/046 |
| 11,027,345 | B2 * | 6/2021 | Bindhammer | B23D 45/048 |
| 2002/0088327 | A1 * | 7/2002 | Young | B23D 45/044 83/477.1 |
| 2002/0144582 | A1 * | 10/2002 | He | B23D 45/048 83/473 |
| 2002/0157516 | A1 * | 10/2002 | Judge | B23D 45/024 83/473 |
| 2002/0170404 | A1 * | 11/2002 | Peot | B27G 19/02 83/478 |
| 2004/0050232 | A1 * | 3/2004 | Lee | B23D 45/02 83/574 |
| 2004/0163520 | A1 * | 8/2004 | Nurenberg | B27B 5/207 83/471.3 |
| 2005/0076759 | A1 * | 4/2005 | Westfall | B23D 45/14 83/47 |
| 2007/0234864 | A1 * | 10/2007 | Bettacchini | B27B 5/165 83/471.3 |
| 2008/0210072 | A1 * | 9/2008 | Chang | B23D 47/02 83/471.3 |
| 2009/0151529 | A1 * | 6/2009 | Miura | B23D 47/126 83/471.3 |
| 2011/0011229 | A1 * | 1/2011 | Lawlor | B23D 59/003 83/100 |
| 2011/0036219 | A1 * | 2/2011 | Finnell | B26D 3/006 83/13 |
| 2012/0118278 | A1 * | 5/2012 | La Banco | B28D 7/04 125/35 |
| 2013/0104717 | A1 * | 5/2013 | Rees | B23D 45/048 83/468.7 |
| 2016/0067801 | A1 * | 3/2016 | Cheng | B27B 5/208 83/471.3 |
| 2016/0243631 | A1 * | 8/2016 | Brewster | B27G 19/02 |
| 2017/0095867 | A1 * | 4/2017 | Hsu | B23D 47/025 |
| 2017/0232534 | A1 * | 8/2017 | Bliznyuk | B23D 47/025 83/471.3 |
| 2018/0071942 | A1 * | 3/2018 | Behr | B27B 9/00 |
| 2019/0358719 | A1 * | 11/2019 | Lentz | B27B 5/22 |
| 2021/0060672 | A1 * | 3/2021 | Lee | B23D 47/025 |

* cited by examiner

SAWING MACHINE

TECHNICAL FIELD

The disclosure relates to the technical field of sawing tools, in particular to a sawing machine.

BACKGROUND

A sawing machine is a commonly used sawing tool. A cutting distance of a traditional sawing machine depends on a diameter of a saw blade. In order to extend the cutting distance without changing the saw blade specification, a sliding sawing machine has been developed currently, which obtains a longer cutting distance by moving a machine body mounted with the saw blade forward and backward relative to a workbench. However, because a saw blade slot on the workbench is required to be cooperated with the saw blade during cutting, the workbench must be increased synchronously to make a length of the saw blade slot on the workbench meet a requirement of the cutting distance. However, an increase in the size of the workbench may result in an increase in the overall volume of the sawing machine, which means a larger packaging size, a higher transport cost and a lower transport effect.

SUMMARY

An object of the present disclosure is to provide a sawing machine for solving the problem existing in the prior art that an extended cutting distance results in an increase in the overall volume of the sawing machine.

In order to achieve the above object, there is provided in the present disclosure a sawing machine including: a base, a main workbench, wherein the main workbench is rotatably connected to the base, an upper surface of the main workbench is provided with a chute, and the chute extends in a first direction and has an open end on an outer side surface of the main workbench; a machine body, wherein the machine body is slidably connected to the main workbench, a sliding direction of the machine body is parallel to the first direction, and the machine body is provided with a motor and a saw blade connected to the motor; an auxiliary workbench, wherein the auxiliary workbench is in an elongated shape and capable of slidably inserting into the chute and protruding out of the chute from the open end, an upper surface of the auxiliary workbench being provided with an elongated groove, the groove extends in the first direction, the groove and the chute are in communication in the first direction and form an extendable saw blade slot, the saw blade slot is elongated by sliding the auxiliary workbench toward outside of the chute, and the saw blade slot is shortened by sliding the auxiliary workbench toward inside of the chute.

In the present disclosure, the main workbench and the auxiliary workbench constitute a split-in workbench, and the chute and the groove constitute a split-in saw blade slot. The length of the overlapped portion of the chute and the groove is reduced by sliding the auxiliary workbench toward the outside of the chute, thereby increasing the length of the saw blade slot. The length of the overlapped portion of the chute and the groove is increased by sliding the auxiliary workbench toward inside of the chute, thereby decreasing the length of the saw blade slot. In actual use, the length of the saw blade slot is adjusted according to the required cutting distance, which is flexible and convenient. In the present disclosure, the saw blade slot can be used as long as the maximum length of the saw blade slot after being extended can reach the requirement of the maximum cutting distance, and it is not necessary to increase the main workbench to meet the requirement of increasing the cutting distance. When in packaging or transportation, the auxiliary workbench is slided into the chute to shorten the saw blade slot to a minimum length, or the auxiliary workbench is detached from the main workbench. Therefore, in the present disclosure, the cutting distance of the sawing machine can be extended, without increasing the overall volume of the sawing machine, increasing the packaging size, and increasing the transportation cost.

BRIEF DESCRIPTION OF DRAWINGS

The following drawings are only intended to schematically illustrate and explain the disclosure and do not limit the scope of the disclosure. Among the drawings.

DESCRIPTION OF EMBODIMENTS

For a clearer understanding of the technical features, objects and effects of the present disclosure, specific embodiments of the present disclosure will now be described with reference to the accompanying drawings. The use of adjective or adverbial modifiers "center", "upper" and "lower," "top" and "bottom," "inner" and "outer" is merely intended to facilitate relative reference between multiple groups of terms and is not intended to describe any particular direction limitations to a modified term. In addition, that terms "first," "second," etc. are used for descriptive purpose only and are not to be construed as indicating or implying relative importance or implicitly indicating the number of the indicated technical features, whereby features defined with "first," "second," etc. may explicitly indicate or implicitly include one or more of the features. In the description of the present disclosure, "multiple" means two or more, unless otherwise indicated. For convenience of description, a surface of the main workbench that faces the saw blade is referred to as an upper surface of the main workbench, and a surface of the auxiliary workbench that faces the saw blade is referred to as an upper surface of the auxiliary workbench.

Figure 1:
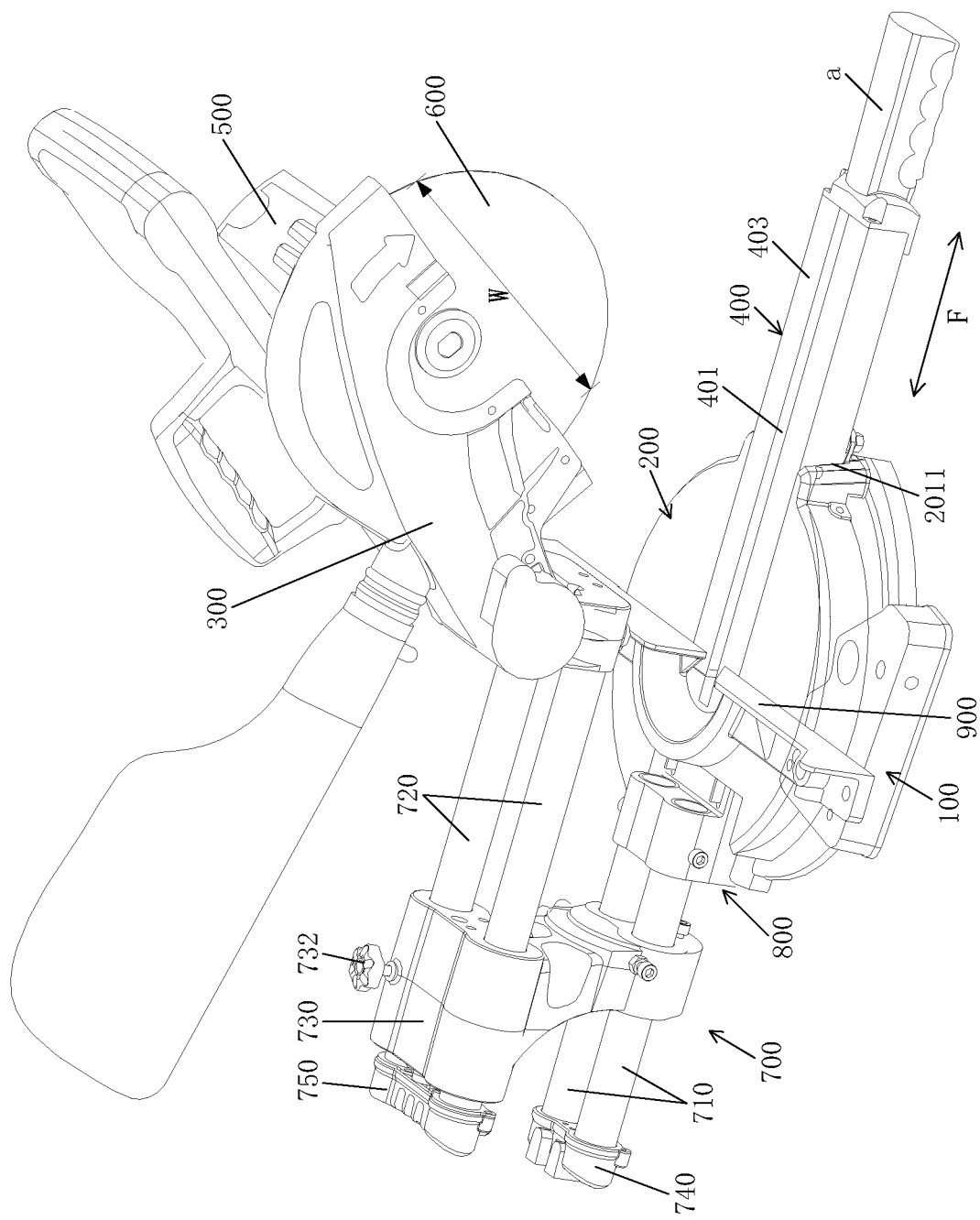
FIG. 1 is an assembly schematic diagram of an embodiment of a sawing machine of the present disclosure.
Figure 3:
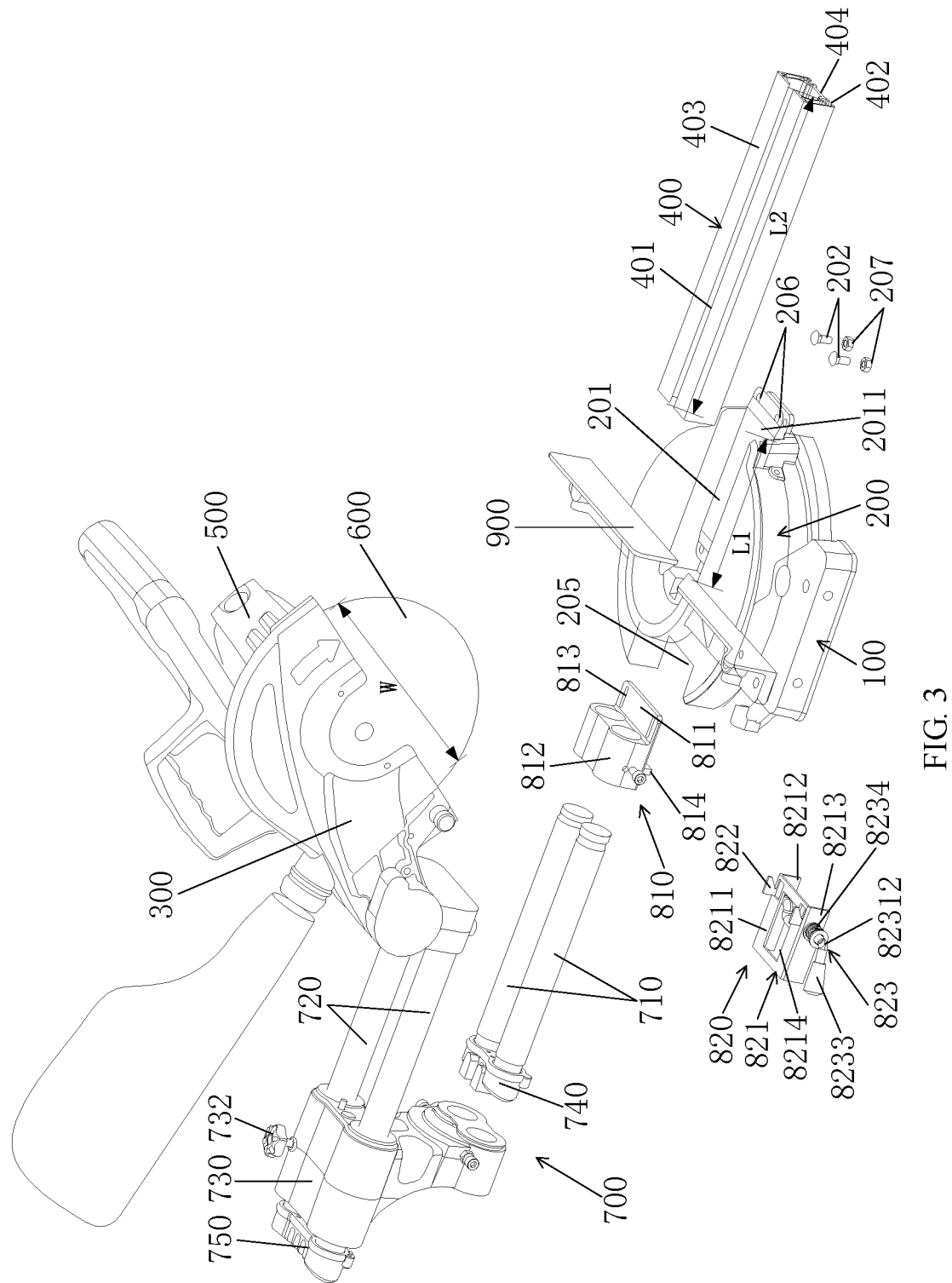
FIG. 3 is an exploded schematic diagram of a specific embodiment of the sawing machine of the present disclosure.

As shown in FIG. 1 and FIG. 3, there is provided in the present disclosure a sawing machine which is a sliding sawing machine, comprising a base 100, a main workbench 200, a machine body 300 and an auxiliary workbench 400. The base 100 may be placed on a supporting surface such as an operating table. The main workbench 200 may be rotatably connected to the base 100. For example, the main workbench 200 and the base 100 are pivotally connected, wherein the specific structure of the base 100 and the connection structure of the main workbench 200 and the base 100 are well-known techniques, and thus are not described here in detail.

The upper surface of the main table 200 is provided with an elongated chute 201. The chute 201 extends in a first direction F, or a length direction of the chute 201 is the first direction F. The chute 201 has an open end 2011 located on an outer side of the main workbench 200. For example, the chute 201 extends from the center of the main workbench 200 to an outer side surface at a side of the main workbench 200. The machine body 300 is slidably connected to the main workbench 200. The sliding direction of the machine body 300 is parallel to the first direction F. The machine body 300 is provided with a motor 500 and a saw blade 600 connected to the motor 500. The saw blade 600 can be driven by the motor 500 to rotate, so as to cut workpieces. The machine body 300 can drive the saw blade 600 to slide back and forth in the first direction F, and the cutting distance of the saw blade 600 is extended by the sliding of the machine body 300.

The auxiliary workbench 400 has an elongated shape, and is slidably inserted into the chute 201, that is, the auxiliary workbench 400 is disposed in the first direction F and is capable of sliding back and forth along the chute 201 (that is, in the first direction F). The auxiliary workbench 400 can extend out of the chute 201 from the open end 2011. The upper surface of the auxiliary workbench 400 is provided with an elongated groove 401. The groove 401 extends in the first direction F, so as to be capable of cooperating with the saw blade 600 that moves in the first direction F. The groove 401 and the chute 201 are in communication in the first direction F and form an extendable saw blade slot which is located directly below the saw blade 600. The saw blade slot is elongated by sliding the auxiliary workbench 400 toward outside of the chute 201, and the saw blade slot is shortened by sliding the auxiliary workbench 400 toward inside of the chute 201.

In the present disclosure, the main workbench 200 and the auxiliary workbench 400 constitute a split-in workbench, and the chute 201 and the groove 401 constitute a split-in saw blade slot. The length of the overlapped portion of the chute 201 and the groove 401 is reduced by sliding the auxiliary workbench 400 toward the outside of the chute 201, thereby increasing the length of the saw blade slot. The length of the overlapped portion of the chute 201 and the groove 401 is increased by sliding the auxiliary workbench 400 toward the inside of the chute 201, thereby decreasing the length of the saw blade slot. In actual use, a workpiece to be cut is placed on the main workbench 200 and the auxiliary workbench 400, the length of the saw blade slot is adjusted according to the required cutting distance, which is flexible and convenient. In the present disclosure, the saw blade slot can be used as long as the maximum length of the saw blade slot after being extended can reach the requirement of the maximum cutting distance, and it is not necessary to increase the main workbench 200 to meet the requirement of increasing the cutting distance. When in packaging or transportation, the auxiliary workbench 400 is slided into the chute 201 to shorten the saw blade slot to a minimum length, or the auxiliary workbench 400 is detached from the main workbench 200. Therefore, in the present disclosure, the cutting distance of the sawing machine can be extended, without increasing the overall volume of the sawing machine, increasing the packaging size, and increasing the transportation cost.

Further, as shown in FIG. 1, a handle a is connected to one end of the auxiliary workbench 400 that extends out of the chute 201, thus the auxiliary workbench 400 can be conveniently moved by using the handle a hold in hand.

In an embodiment, as shown in FIG. 1 and FIG. 3, the machine body 300 has a maximum sliding distance with respect to the main workbench 200, and the saw blade 600 has a maximum cutting width W. Herein, a sum of the maximum sliding distance and the maximum cutting width W is the maximum cutting distance of the saw machine. The maximum length of the saw blade slot is not less than the sum of the maximum sliding distance and the maximum cutting width W, such that the maximum length of the saw blade slot meets the requirement of the maximum cutting distance.

Further, the maximum length of the saw blade slot is equal to the sum of the maximum sliding distance and the maximum cutting width W, that is, the maximum length of the saw blade slot exactly meets the requirement of the maximum cutting distance, and the saw blade slot does not exceed an invalid length of the maximum cutting distance, so as to reduce the overall volume of the sawing machine.

As shown in FIG. 1 and FIG. 3, further, the maximum length of the saw blade slot is the sum of the length L1 of the chute 201 and the length L2 of the groove 401, that is, a limit position to which the auxiliary workbench 400 slides toward the outside of the chute 201 and a limit position to which the auxiliary workbench 400 slides toward the inside of the chute 201 are opposite ends of the chute 201, respectively, such that the overall length of the chute 201 is fully utilized, so as to further reduce the overall volume of the sawing machine.

Further, as shown in FIG. 1 and FIG. 3, the maximum cutting width W of the saw blade 600 is equal to the diameter of the saw blade 600, so as to facilitate to extend the cutting distance, but the present disclosure is not limited to this, and the maximum cutting width may also be less than the diameter of the saw blade 600, and generally the maximum cutting width of the saw blade 600 may be decided by a set cutting depth of the saw blade 600.

Further, as shown in FIG. 1, the main workbench 200 is disc-shaped, and the first direction F is a radial direction of the main workbench 200, but the first direction F is not limited to a specific direction that is radially inward or outward in the radial direction of the main workbench 200.

Further, as shown in FIG. 1 and FIG. 3, the chute 201 is a rectangular groove, the auxiliary workbench 400 is a sectional material with a rectangular section, and the groove 401 is a through groove penetrating through the auxiliary workbench 400 in the first direction F.

Figure 6:
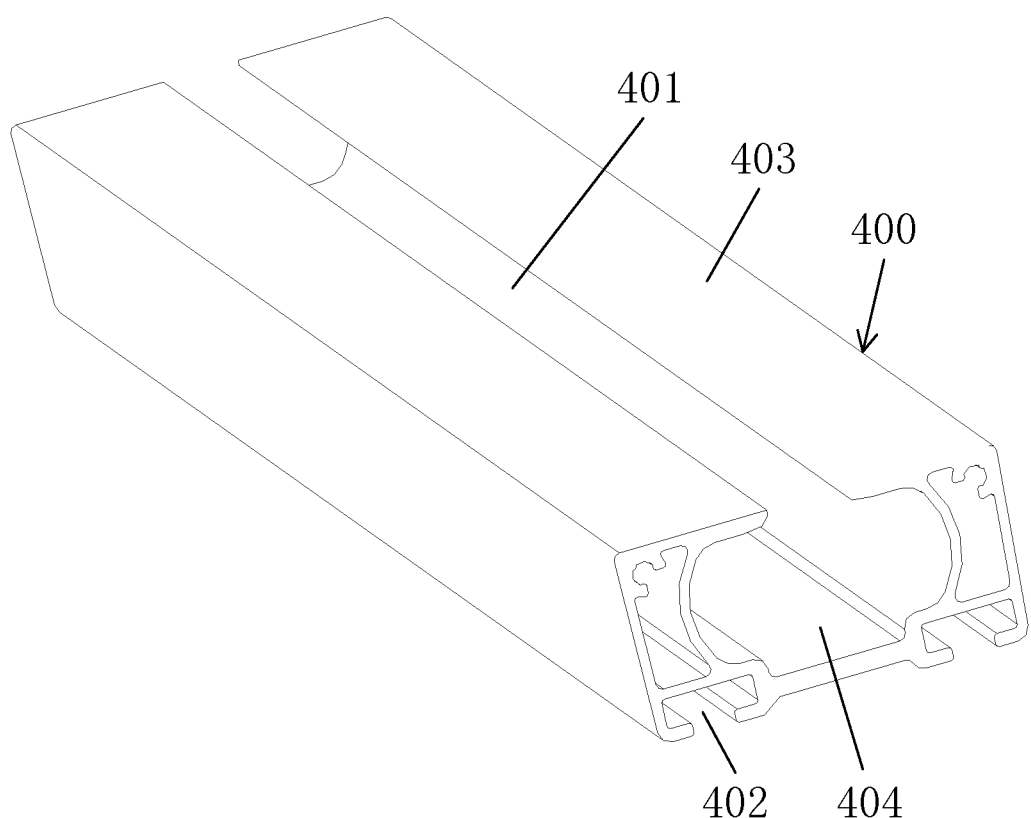
FIG. 6 is a schematic diagram of an auxiliary workbench of FIG. 3.

As shown in FIG. 3 and FIG. 6, in one specific embodiment, a lower surface of the auxiliary workbench 400 is provided with a guide groove 402, and the lower surface of the auxiliary workbench 400 is a surface opposite to an upper surface of the auxiliary workbench 400. The guide groove 402 extends in the first direction F. A guide rod 202 is fixed on a bottom surface of the chute 201, and the guide rod 202 is inserted into the guide groove 402 and can slide along the guide groove 402. That is, when the auxiliary workbench 400 slides along the chute 201, the guide rod 202 slides along the guide groove 402, and the guide rod 202 and the guide groove 402 cooperate to serve as a guide for sliding the auxiliary workbench 400, such that the auxiliary workbench 400 can slide in the first direction F without deviating from the first direction F. For example, the guide rod 202 is a T-shaped screw, and the bottom surface of the chute 201 is provided with a through hole 206, an upper end of the guide rod 202 is inserted into the guide groove 402, a lower end of the guide rod 202 passes through the through hole 206, and the lower end of the guide rod 202 is connected with a nut 207 to position the guide rod 202 within the through hole 206.

Figure 4:
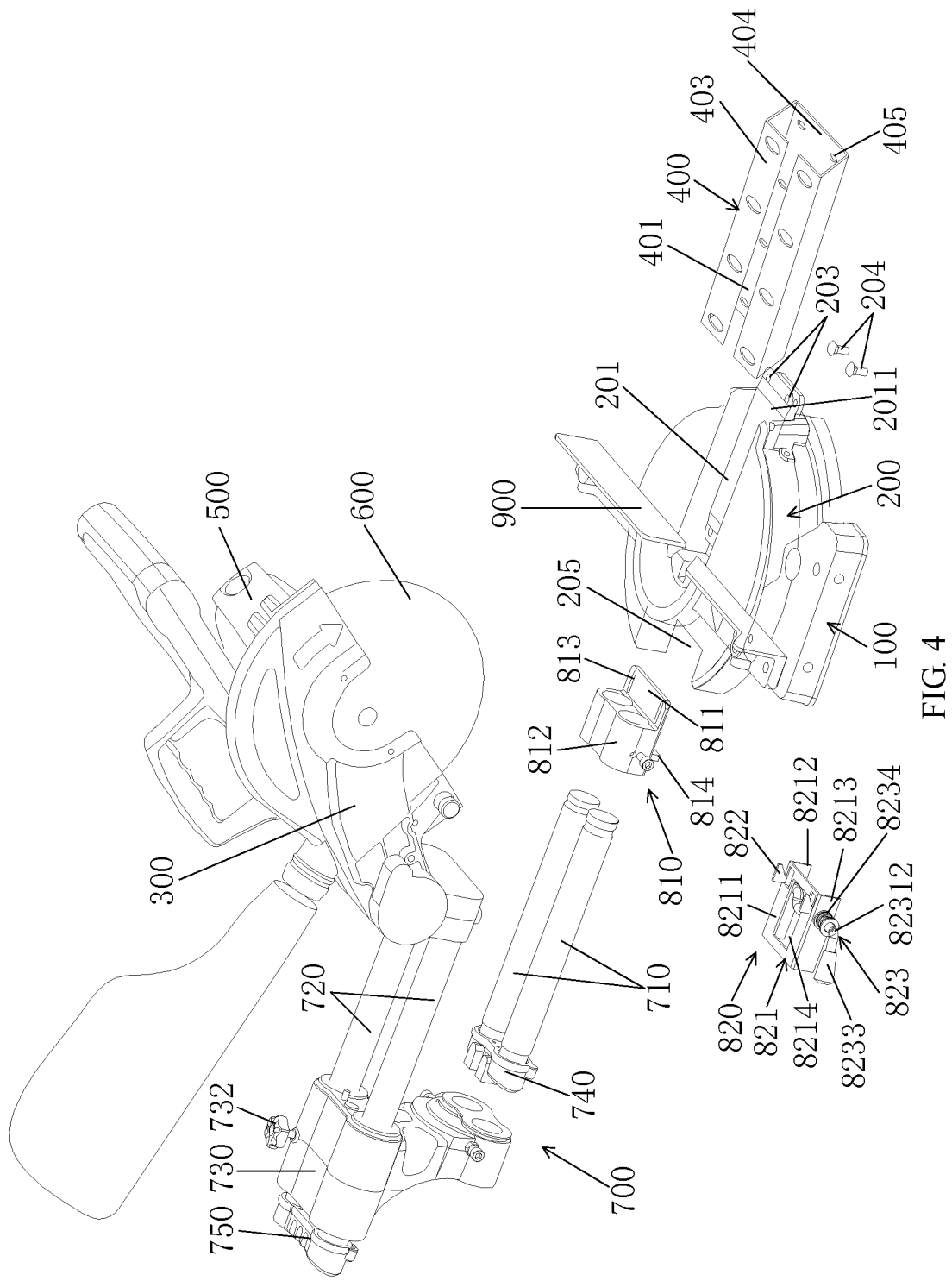
FIG. 4 is an exploded schematic diagram of another specific embodiment of the sawing machine of the present disclosure.
Figure 7:
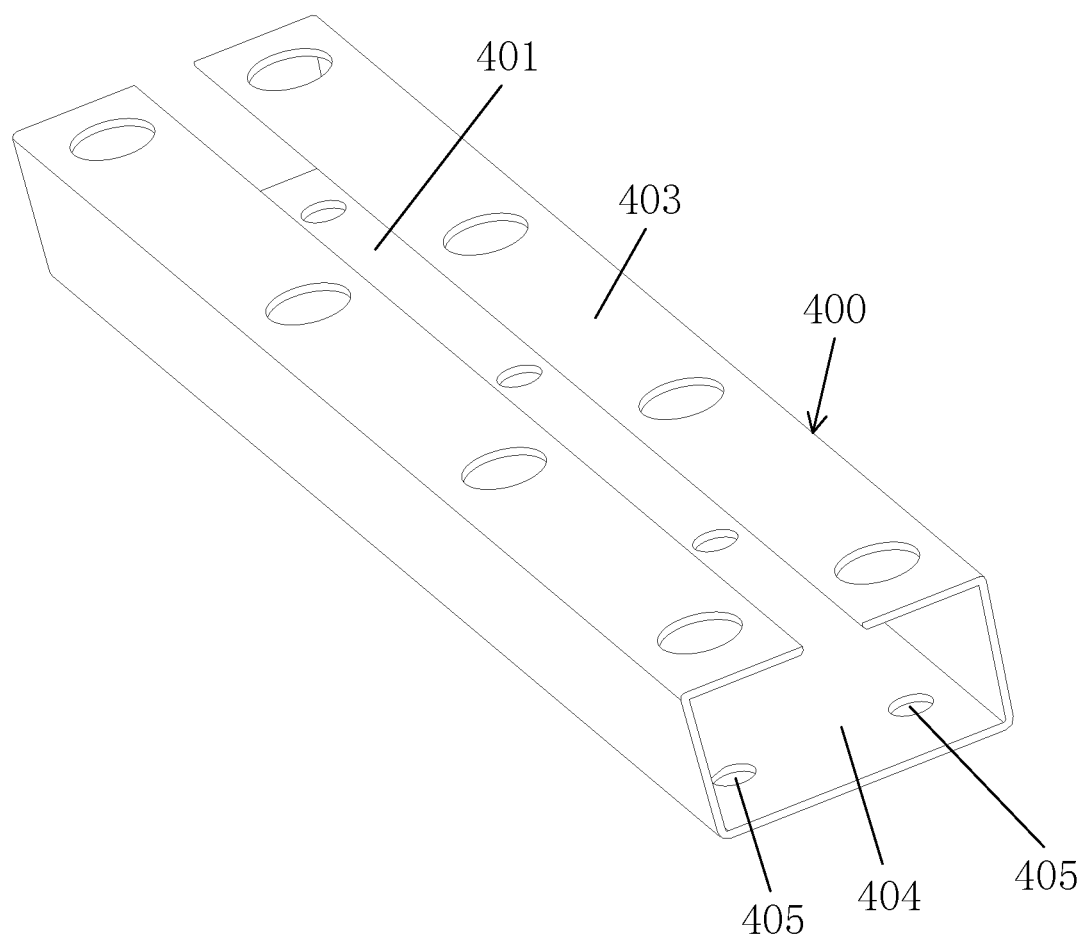
FIG. 7 is a schematic diagram of the auxiliary workbench of FIG. 4.

As shown in FIG. 4 and FIG. 7, in another specific embodiment, the auxiliary workbench 400 has a hollow structure, the auxiliary workbench 400 has a top plate 403 and a bottom plate 404 opposite to each other, the groove 401 is provided on the top plate 403, the groove 401 extends through the top plate 403, and the bottom plate 404 is provided with a plurality of through holes 405 which are arranged at intervals in the first direction F. The bottom surface of the chute 201 is provided with an insertion hole 203, one of the through holes 405 is aligned with the insertion hole 203 by sliding the auxiliary workbench 400 along the chute 201, and the auxiliary workbench 400 is positioned by inserting a fixing rod 204 into the through hole 405 and the insertion hole 203 that are aligned. In this embodiment, the plurality of through holes 405, the insertion hole 203 and the fixing rod 204 cooperate to position the auxiliary workbench 400 at a desired position and further prevent the auxiliary workbench 400 from deviating from the first direction F. For example, the fixing rod 204 is a T-shaped screw, and the distance between two adjacent through holes 405 may be set according to actual needs, for example, the distance between the two adjacent through holes 405 is 5 cm, and the less the distance is, the higher the adjustment accuracy of the position of the auxiliary workbench 400 is. For example, the bottom surface of the chute 201 is provided with two insertion holes 203 arranged at an interval along the width direction of the chute 201, and the bottom plate 404 of the auxiliary workbench 400 is provided with two rows of through holes 405 arranged at intervals along the width direction of the bottom plate 404.

As shown in FIG. 1, in one embodiment, the machine body 300 is slidably connected to the main workbench 200 by a sliding connection device 700. The sliding connection device 700 includes at least one first drawbar 710 that is fixed in a cantilevered shape at a side of the main workbench 200 that is distal from the chute 201. The length direction of the first drawrod 710 is parallel to the first direction F, and the machine body 300 is slidably connected to the first drawrod 710.

In the embodiments, when the machine body 300 is slidably connected to the main workbench 200 through the first drawrod 710, the maximum sliding distance of the machine body 300 is equal to the length of the first drawrod 710.

In another embodiment, the sliding connection device 700 includes not only a first drawrod 710 but also at least one second drawrod 720 and a sliding base 730 that are connected between the first drawrod 710 and the machine body 300. The sliding base 730 is slidably connected to the first drawrod 710. The second drawrod 720 is fixed in a cantilevered shape at a side of the machine body 300 that is distal from the saw blade 600. The length direction of the second drawrod 720 is parallel to the first direction F. The second drawrod 720 is slidably connected to the sliding base 730.

In the embodiments, when the machine body 300 is slidably connected to the main workbench 200 through the first drawrod 710 and the second drawrod 720, the maximum sliding distance of the machine body 300 is equal to the sum of the length of the first drawrod 710 and the length of the second drawrod 720. By providing the first drawrod 710 and the second drawrod 720, the sliding distance of the machine body 300 can be further extended as compared to providing only the first drawrod 710, thereby further extending the maximum cutting distance of the sawing machine.

In addition, in the embodiments, by providing the first drawrod 710, the second drawrod 720 and the sliding base 730 that are capable of sliding relative to each other, the size of the sliding connection device 700 can be adjusted to the minimum by sliding the second drawrod 720 and the sliding base 730 during packaging and transportation, thereby reducing the overall volume of the sawing machine, reducing the size of the package and reducing transportation costs.

However, the present disclosure is not limited to this, and the machine body 300 may be slidably connected to the main workbench 200 through a sliding connection device in the prior art.

Figure 2:
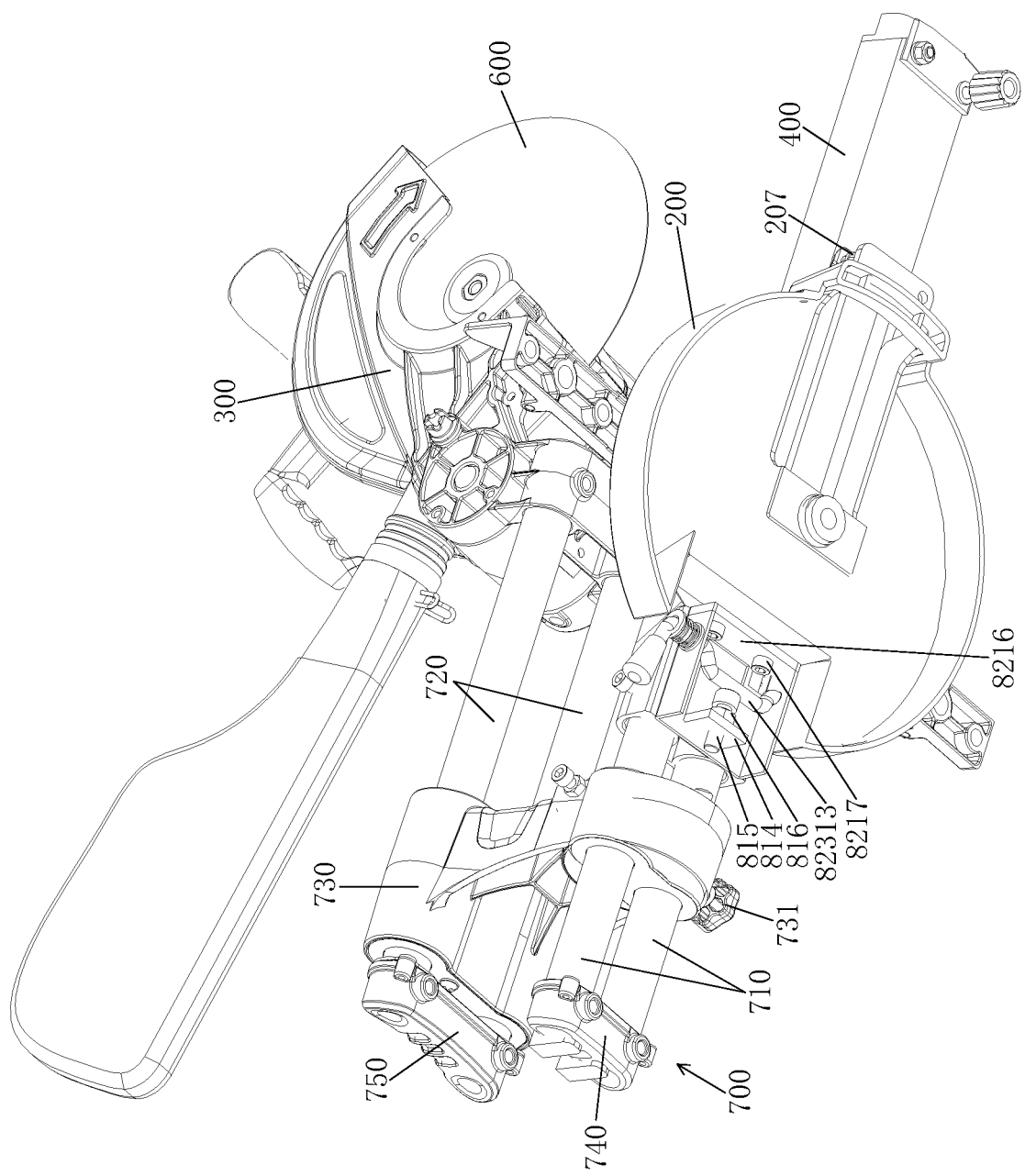
FIG. 2 is a bottom view of an embodiment of the sawing machine of the present disclosure.

In the embodiments, specifically, the second drawrod 720 is connected to the machine body 300 through a connecting base 760 (as shown in FIG. 2). The connecting base 760 is fixed at an end of the second drawrod 720. The machine body 300 is rotatably connected to the connecting base 760. For example, the machine body 300 and the connecting base 760 are pivotally connected, so as to rotate the machine body 300 towards a direction close to the saw blade slot when cutting the workpiece, such that the saw blade 600 cuts the workpiece.

Further, as shown in FIG. 1, the first drawrod 710 extends through the sliding base 730 in the first direction F, the second drawrod 720 extends through the sliding base 730 in the first direction F, and the second drawrod 720 is located above the first drawrod 710.

Further, as shown in FIG. 1, the number of the first drawrods 710 is two, and the two first drawrods 710 are arranged at an interval side by side. The number of the second drawrods 720 is two, and the two second drawrods 720 are arranged at an interval side by side. However, the present disclosure is not limited thereto, the number of the first drawrod 710 may be one, and the number of the second drawrod 720 may be one.

Further, as shown in FIG. 1, a first limiting member 740 is provided at an end of the first drawrod 710 that is distal from the main workbench 200 to limit the sliding base 730 when the sliding base 730 slides relative to the first drawrod 710. A second limiting member is provided at an end of the second drawrod 720 that is distal from the machine body 300 to limit the sliding base 730 when the sliding base 730 slides relative to the second drawrod 720. Specifically, the first limiting member 740 is in a cover shape, which sleeves outside the end of the first drawrod 710. The second limiting member 750 is in a cover shape, which sleeves outside the end of the second drawrod 720.

Further, as shown in FIG. 1, the slide base 730 is provided with a first locking knob 731 for locking the first drawrod 710 and the sliding base 730 in the relative positions, so as to position the sliding base 730 at any positions during the sliding of the sliding base 730.

Further, as shown in FIG. 2, the sliding base 730 is provided with a second locking knob 732 for locking the second drawrod 720 and the sliding base 730 in the relative positions, so as to position the second drawrod 720 at any position during the sliding of the second drawrod 720.

As shown in FIG. 1, in an embodiment, the sliding connection device 700 is detachably connected to the main workbench 200. The sliding connection device 700 is detached from the main workbench 200 during packing and transportation. The sliding connection device 700 and the main workbench 200 are separately packed during transportation, to further reduce the size of the package and reduce transportation costs.

As shown in FIGS. 1, 3, 4, 8, 9 and 10, in a specific embodiment, the sliding connection device 700 is detachably connected to the main workbench 200 through a connecting assembly 800 including a first connecting member 810 fixedly connected to the first drawrod 710 and a second connecting member 820 fixedly connected to the main workbench 200. The first connecting member 810 includes a bottom plate 811 and a sleeve 812 provided on the bottom plate 811. The axial direction of the sleeve 812 is parallel to the first direction F. The first drawrod 710 is inserted into the sleeve 812 along the first direction F and is inserted and fixed to the sleeve 812. The bottom plate 811 is provided with a connecting groove 813. The second connecting member 820 includes a housing 821 and a connecting hook 822 fixed on the housing 821. The housing 821 is fixedly connected to the main workbench 200. The connecting hook 822 is inserted into the connecting groove 813 in a second direction perpendicular to the first direction F and is inserted and fixed to the connecting groove 813, so as to connect the first drawrod 710 and the main workbench 200 together, and the connecting hook 822 and the connecting groove 813 are separated when the sliding connection device 700 and the main workbench 200 are detached.

Figure 8:
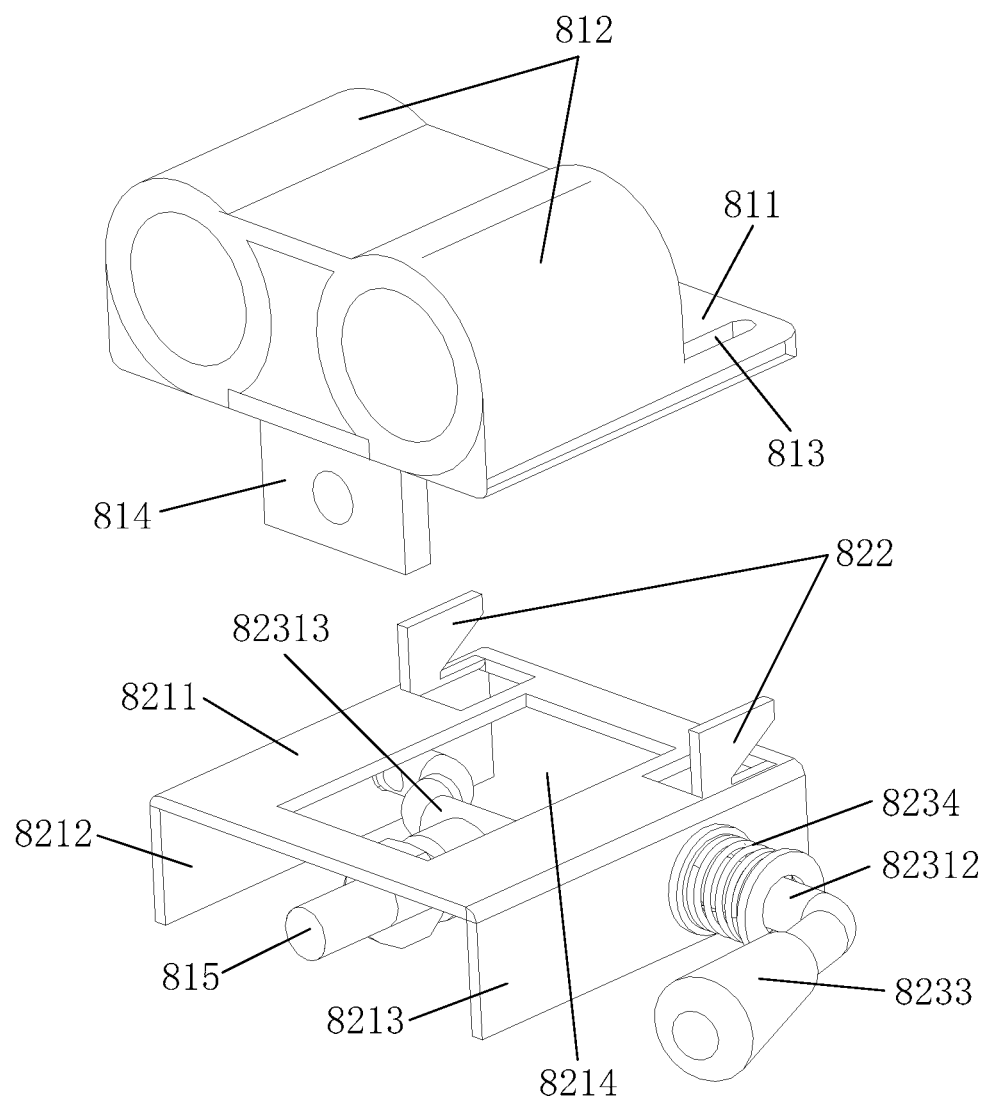
FIG. 8 is an exploded schematic diagram of an embodiment of a connection assembly in the present disclosure.
Figure 9:
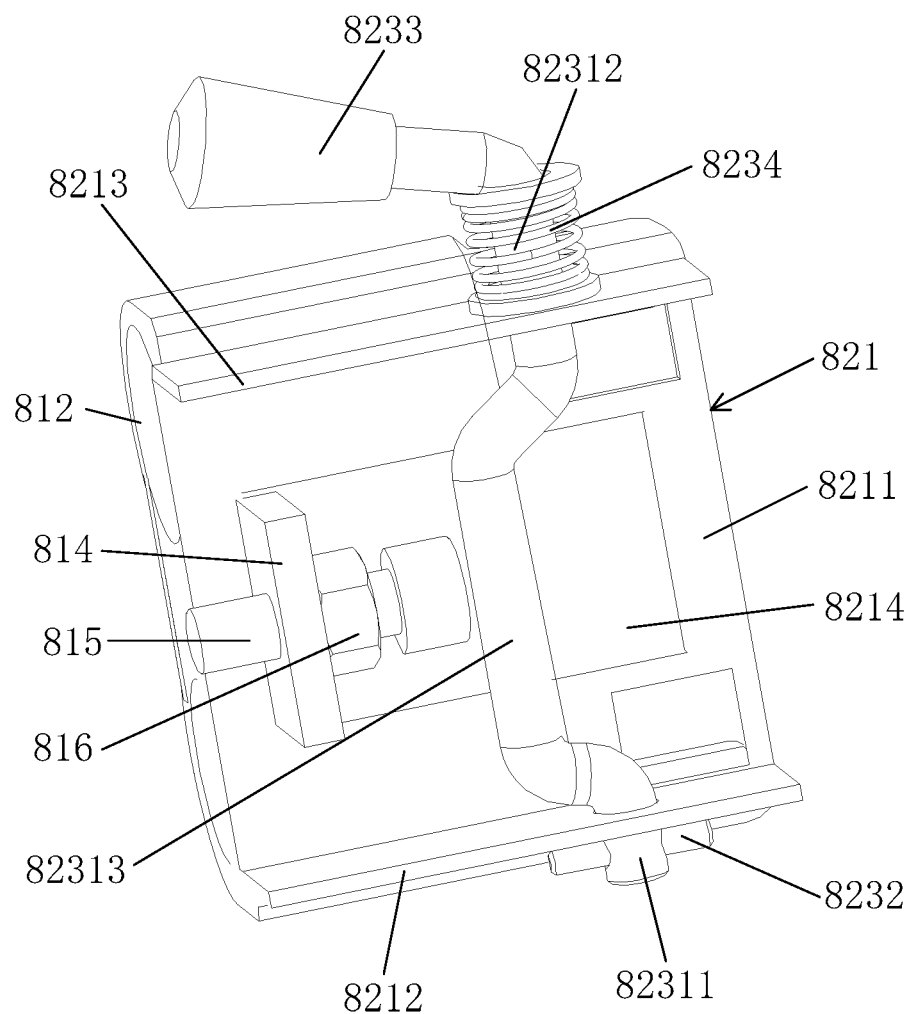
FIG. 9 is a bottom view of the connection assembly of FIG. 8 in an assembled state.
Figure 10:
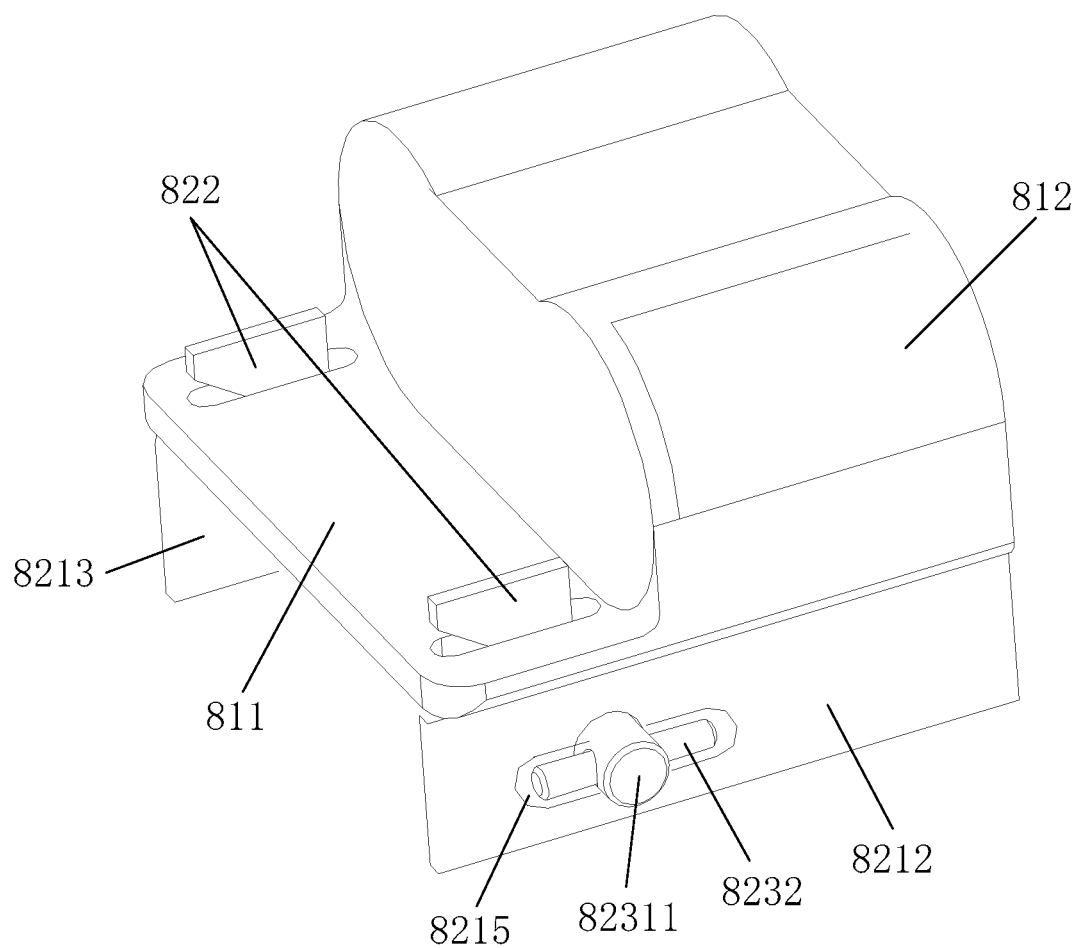
FIG. 10 is an isometric diagram of the connection assembly of FIG. 9.

Further, as shown in FIGS. 8, 9 and 10, the housing 821 includes a top plate 8211, and a first side plate 8212 and a second side plate 8213 that are connected at the bottom of the top plate 8211 and disposed at opposite sides of the top plate 8211. The first side plate 8212 and the second side plate 8213 are parallel to each other. The connecting hook 822 is disposed on the upper surface of the top plate 8211. The top plate 8211 is provided with an opening 8214. A bottom plate 811 of the first connecting member 810 is placed on the top plate 8211 of the second connecting member 820. A sleeve 812 is disposed on an upper surface of the bottom plate 811 of the first connecting member 810. An insertion plate 814 is disposed on a lower surface of the bottom plate 811 of the first connecting member 810. The insertion plate 814 is inserted into the housing 821 via an opening 8214 in a second direction. The second connecting member 820 further includes a locking assembly 823 for locking the insertion plate 814 within housing 821, so as to lock the first connecting member 810 and the second connecting member 820, and improve stability of connection between the sliding connection device 700 and the main workbench 200.

Further, as shown in FIGS. 8, 9 and 10, the locking assembly 823 includes an eccentric shaft 8231 extending through the first side plate 8212 and the second side plate 8213. The eccentric shaft 8231 is disposed in a third direction perpendicular to the first direction F and the second direction. The eccentric shaft 8231 has a first end 82311 and a second end 82312 that are opposite and located outside the housing 821. The first end 82311 of the eccentric shaft 8231 is located outside the first side plate 8212, and the first end 82311 is connected with a positioning pin 8232, and specifically, the positioning pin 8232 is perpendicular to an axial direction of the first end 82311 of the eccentric shaft 8231, and the positioning pin 8232 extends through the first end 82311 of the eccentric shaft 8231. A positioning groove 8215 capable of being matched with the positioning pin 8232 is provided on the outer side surface of the first side plate 8212. The second end 82312 of the eccentric shaft 8231 is located outside the second side plate 8213. The second end 82312 of the eccentric shaft 8231 is connected with a handle 8233 inclined with respect to the second end 82312. A compression spring 8234 is sleeved on the outside of the second end 82312 of the eccentric shaft 8231. Opposite ends of the compression spring 8234 abut against outer surfaces of the handle 8233 and the second side plate 8213, respectively. The eccentric shaft 8231 positions the positioning pin 8232 within the positioning groove 8215 by a restoring force of the compression spring 8234, so as to limit rotation of the eccentric shaft 8231. The eccentric shaft 8231 further has a curved eccentric section 82313 located inside the housing 821, and specifically, the eccentric section 82313 is curved toward the same side of the first end 82311 and the second end 82312 of the eccentric shaft 8231. An adjusting bolt 815 is connected onto the insertion plate 814. The adjusting bolt 815 is disposed in the first direction F. The adjusting bolt 815 extends through the insertion plate 814 and is threadedly connected with the insertion plate 814. The distance between the adjusting bolt 815 and the eccentric section 82313 is adjusted by rotating the adjusting bolt 815. The positioning pin 8232 is disengaged from the positioning groove 8215 by pushing the handle 8233 toward the first side plate 8212. After the positioning pin 8232 is disengaged from the positioning groove 8215, the eccentric section 82313 is rotated in the housing 821 towards a direction close to the adjusting bolt 815 by rotating the handle 8233 until the eccentric section 82313 is pressed against the adjusting bolt 815. After releasing the handle 8233, the positioning pin 8232 is positioned within the positioning groove 8215 under the action of the restoring force of the compression spring 8234 so as to fix the insertion plate 814 inside the housing 821, thereby locking the first connecting member 810 and the second connecting member 820 through the eccentric shaft 8231, thereby improving stability of connection between the sliding connection device 700 and the main workbench 200.

Further, as shown in FIG. 2, the housing 821 further includes a third side plate 8216 connected at the bottom of the top plate 8211, the third side plate 8216 is located between the first side plate 8212 and the second side plate 8213, the third side plate 8216 is perpendicular to the first side plate 8212 and the second side plate 8213, and the third side plate 8216 is connected to the main workbench 200 by a bolt 8217.

Further, as shown in FIG. 9, a nut 816 sleeves outside the adjusting bolt 815, and the nut 816 is located on a side of the insertion plate 814 that faces the eccentric shaft 8231. The nut 816 is threadedly connected to the adjusting bolt 815, and the nut 816 abuts against the insertion plate 814.

Figure 5:
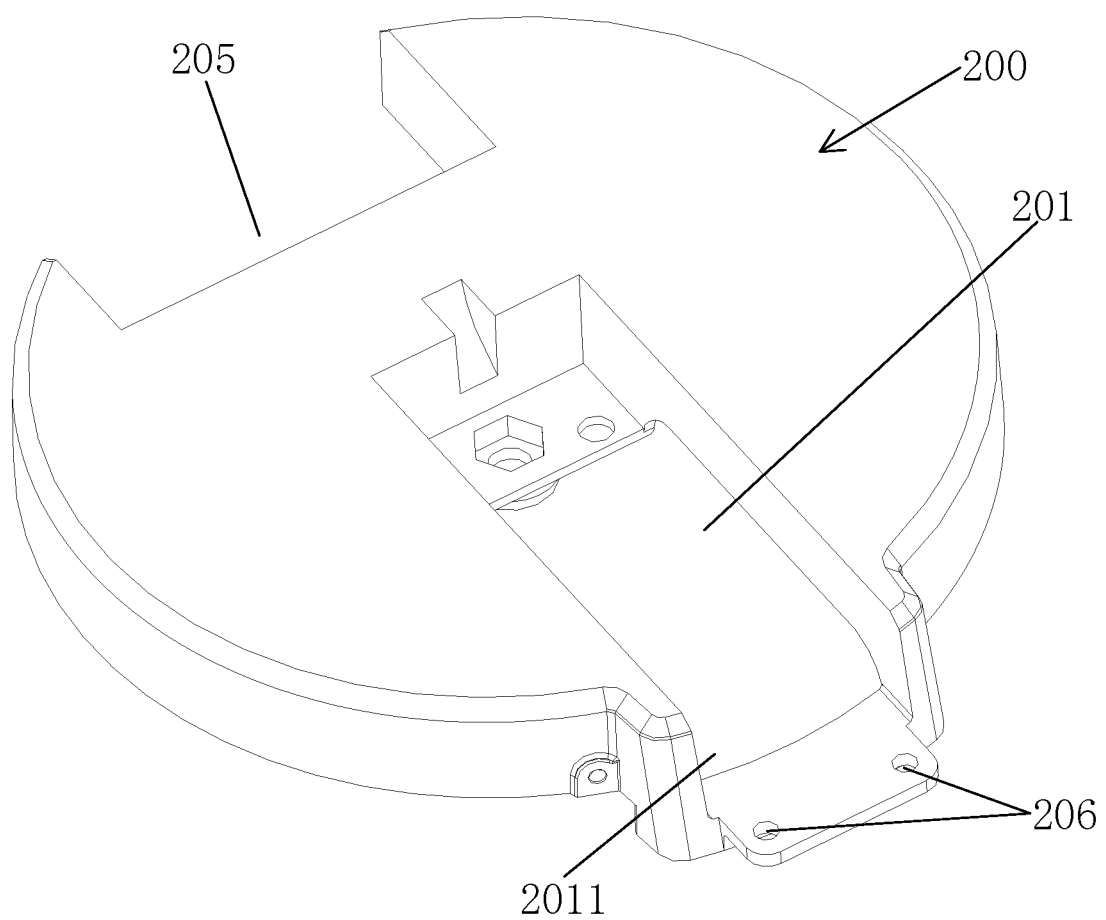
FIG. 5 is a schematic diagram of the main workbench of FIG. 3.

Further, as shown in FIGS. 3, 4 and 5, a receiving groove 205 is provided on a side of the main workbench 200 that is distal from the chute 201, and the first connecting member 810 and the second connecting member 820 are disposed within the receiving groove 205.

As shown in FIG. 1, in an embodiment, the sawing machine further includes a backup plate 900 connected to the base 100, the backup plate 900 is positioned above the main workbench 200, the backup plate 900 is perpendicular to the upper surface of the main workbench 200, and the backup plate 900 serves as a positioning reference for the workpiece to be cut to abut.

The foregoing is merely illustrative embodiments of the disclosure and is not intended to limit the scope of the disclosure. Any equivalent changes and modifications made by those skilled in the art without departing from the concepts and principles of the present disclosure shall fall within the scope of the present disclosure. It should also be noted that the components of the present disclosure are not limited to the above-described overall application, and the technical features described in the specification of the present disclosure can be selected to be used individually or in combination according to actual needs, and therefore, the present disclosure deservedly encompasses other combinations and specific applications related to the inventive points of the present application.

What is claimed is:

1. A sawing machine, comprising:
   a base;
   a main workbench, wherein the main workbench is rotatably connected to the base, an upper surface of the main workbench is provided with a chute, and the chute extends in a first direction and has an open end on an outer side surface of the main workbench;
   a machine body, wherein the machine body is slidably connected to the main workbench, a sliding direction of the machine body is parallel to the first direction, and the machine body is provided with a motor and a saw blade connected to the motor;
   an auxiliary workbench, wherein the auxiliary workbench is in an elongated shape and capable of being slidably inserted into the chute and protruded out of the chute from the open end, an upper surface of the auxiliary workbench is provided with an elongated groove, the groove extends in the first direction, the groove and the chute are in communication in the first direction and form an extendable saw blade slot, the saw blade slot is elongated by sliding the auxiliary workbench toward outside of the chute, and the saw blade slot is shortened by sliding the auxiliary workbench toward inside of the chute.

2. The sawing machine according to claim 1, wherein the machine body has a maximum sliding distance with respect to the main workbench, the saw blade has a maximum cutting width, a maximum length of the saw blade slot is not less than a sum of the maximum sliding distance and the maximum cutting width.

3. The sawing machine according to claim 2, wherein the maximum length of the saw blade slot is equal to the sum of the maximum sliding distance and the maximum cutting width.

4. The sawing machine according to claim 2, wherein the maximum length of the saw blade slot is equal to a sum of a length of the chute and a length of the groove.

5. The sawing machine according to claim 2, wherein the saw blade is disc-shaped, and the maximum cutting width of the saw blade is equal to a diameter of the saw blade.

6. The sawing machine according to claim 1, wherein the main workbench is disc-shaped, and the first direction is a radial direction of the main workbench.

7. The sawing machine according to claim 1, wherein a lower surface of the auxiliary workbench is provided with a guide groove, the guide groove extends in the first direction, a guide rod is fixed on a bottom surface of the chute, and the guide rod is inserted into the guide groove and is capable of sliding along the guide groove.

8. The sawing machine according to claim 1, wherein the auxiliary workbench has a hollow structure, the auxiliary workbench has a top plate and a bottom plate, the groove extends through the top plate, the bottom plate is provided with a plurality of through holes that are arranged at intervals in the first direction, the bottom surface of the chute is provided with an insertion hole, one of the through holes is aligned with the insertion hole by sliding the auxiliary workbench, and the auxiliary workbench is positioned by inserting a fixing rod into the through hole and the insertion hole that are aligned.

9. The sawing machine according to claim 1, wherein the machine body is slidably connected to the main workbench by a sliding connection device, the sliding connection device comprises at least one first drawrod, the first drawrod is fixed in a cantilevered shape at a side of the main workbench that is distal from the chute, a length direction of the first drawrod is parallel to the first direction, and the machine body is slidably connected to the first drawrod.

10. The sawing machine according to claim 9, wherein the sliding connection device further comprises at least one second drawrod and a sliding base that are connected between the first drawrod and the machine body, the sliding base is slidably connected to the first drawrod, the second drawrod is fixed in a cantilevered shape at a side of the machine body that is distal from the saw blade, a length direction of the second drawrod is parallel to the first direction, and the second drawrod is slidably connected to the sliding base.

11. The sawing machine according to claim 10, wherein the first drawrod extends through the sliding base in the first direction, the second drawrod extends through the sliding base in the first direction, and the second drawrod is located above the first drawrod.

12. The sawing machine according to claim 10, wherein the number of the first drawrods is two, and the two first drawrods are arranged at an interval side by side; the number of the second drawrods is two, and the two second drawrods are arranged at an interval side by side.

13. The sawing machine according to claim 9, wherein the sliding connection device is detachably connected to the main workbench.

14. The sawing machine according to claim 13, wherein the sliding connection device is detachably connected to the main workbench through a connecting assembly, the connecting assembly comprises a first connecting member fixedly connected to the first drawrod and a second connecting member fixedly connected to the main workbench;
   the first connecting member comprises a bottom plate and a sleeve provided on the bottom plate, an axial direction of the sleeve is parallel to the first direction, the first drawrod is inserted and fixed to the sleeve, and the bottom plate is provided with a connecting groove;
   the second connecting member comprises a housing and a connecting hook fixed on the housing, the housing is fixedly connected to the main workbench, and the connecting hook is inserted to the connecting groove.

15. The sawing machine according to claim 14, wherein the housing comprises a top plate and a first and a second side plates that are disposed at opposite sides of the top plate, the connecting hook is disposed on an upper surface of the top plate, the top plate is provided with an opening, the bottom plate is placed on the top plate, the sleeve is disposed on an upper surface of the bottom plate, an insertion plate is disposed on a lower surface of the bottom plate, the insertion plate is inserted into the housing via the opening, and the second connecting member further comprises a locking assembly for locking the insertion plate within the housing.

16. The sawing machine according to claim 15, wherein the locking assembly comprises an eccentric shaft extending through the first side plate and the second side plate, the eccentric shaft has a first end and a second end that are opposite and located outside the housing, the first end of the eccentric shaft is located outside the first side plate, the first end is connected with a positioning pin, a positioning groove capable of matching with the positioning pin is provided on the outer side surface of the first side plate, the second end of the eccentric shaft is located outside the second side plate, the second end is connected with a handle that is inclined with respect to the second end, a compression spring sleeves on the outside of the second end, opposite ends of the compression spring abut against outer surfaces of the handle and the second side plate respectively, the eccentric shaft positions the positioning pin within the positioning groove under the action of a restoring force of the compression spring, the eccentric shaft further has a curved eccentric section located inside the housing, an adjusting bolt is connected to the insertion plate, the positioning pin is disengaged from the positioning groove by pushing the handle toward the first side plate, and the eccentric section is rotated in the housing and is abutted against the adjusting bolt by rotating the handle in a state that the positioning pin is disengaged from the positioning groove.

* * * * *